(12) United States Patent
Gadsden Lopez et al.

(10) Patent No.: US 10,844,589 B2
(45) Date of Patent: Nov. 24, 2020

(54) LAMINATE CELL CONSTRUCTION SYSTEM

(71) Applicants: Carlos Gadsden Lopez, Mexico City (MX); Carlos Eduardo Gadsden Hevia, Mexico City (MX)

(72) Inventors: Carlos Gadsden Lopez, Mexico City (MX); Carlos Eduardo Gadsden Hevia, Mexico City (MX)

(*) Notice: Subject to any disclaimer, the term of this patent is extended or adjusted under 35 U.S.C. 154(b) by 0 days.

(21) Appl. No.: 15/764,254

(22) PCT Filed: Sep. 27, 2016

(86) PCT No.: PCT/IB2016/055782
§ 371 (c)(1),
(2) Date: Mar. 28, 2018

(87) PCT Pub. No.: WO2017/056006
PCT Pub. Date: Apr. 6, 2017

(65) Prior Publication Data
US 2018/0274222 A1  Sep. 27, 2018

(30) Foreign Application Priority Data
Sep. 28, 2015 (MX) .................... MX/a/2015/013769

(51) Int. Cl.
*E04B 7/10* (2006.01)
*E04B 1/19* (2006.01)
(Continued)

(52) U.S. Cl.
CPC .................. *E04B 1/19* (2013.01); *B32B 3/12* (2013.01); *E04C 2/36* (2013.01); *E04C 2/365* (2013.01);
(Continued)

(58) Field of Classification Search
CPC .......... E04B 1/19; E04B 1/3416; E04C 2/365; E04C 2/36; E04C 2/34; B32B 3/12; B32B 15/043
(Continued)

(56) References Cited

U.S. PATENT DOCUMENTS 3,025,935 A    3/1962  Ensrud
3,663,346 A *  5/1972  Schoen ................... B64C 3/00
                                                 428/116
(Continued)

FOREIGN PATENT DOCUMENTS

EP   0549499 A1   6/1993
MX   9502477 A   12/1996
(Continued)

OTHER PUBLICATIONS

International Search Report and Written Opinion of the International Searching Authority in PCT application PCT/IB2016/055872 dated Feb. 8, 2017.

*Primary Examiner* — Basil S Katcheves
(74) *Attorney, Agent, or Firm* — Saul Ewing Arnstein & Lehr LLP; Domingos J. Silva; Paul A. Leicht

(57) ABSTRACT

The present invention proposes a novel construction system consisting of the attachment of modified hyperboloid shaped-structural elements called "laminate cells" which, when working together, create a structural system with integrated cover having the capacity of absorbing and transmitting stresses in all directions and orientations.

9 Claims, 12 Drawing Sheets

(51) Int. Cl.
*B32B 3/12* (2006.01)
*E04C 2/36* (2006.01)
*F16S 3/04* (2006.01)
*E04C 2/34* (2006.01)
*B32B 15/04* (2006.01)
*E04B 1/34* (2006.01)

(52) U.S. Cl.
CPC .............. *F16S 3/04* (2013.01); *B32B 15/043* (2013.01); *E04B 1/3416* (2013.01); *E04C 2002/3433* (2013.01)

(58) Field of Classification Search
USPC ........................................................ 52/80.2
See application file for complete search history.

(56) References Cited

U.S. PATENT DOCUMENTS

| | | | |
|---|---|---|---|
| 3,696,452 A | 10/1972 | Ziegler | |
| 4,265,955 A * | 5/1981 | Harp | B29D 24/005 428/116 |
| 5,623,790 A * | 4/1997 | Lalvani | A63B 9/00 52/79.1 |
| 6,418,673 B1 * | 7/2002 | Flowerday | E04B 1/3211 52/81.1 |
| 8,826,602 B1 * | 9/2014 | Lipscomb | E04B 1/19 52/648.1 |
| 2003/0070593 A1 | 4/2003 | Halavais | |
| 2010/0218437 A1 | 9/2010 | Newland | |
| 2012/0021168 A1 * | 1/2012 | Tanii | B32B 3/12 428/116 |

FOREIGN PATENT DOCUMENTS

| | | |
|---|---|---|
| WO | WO 2005/053946 A2 | 6/2005 |
| WO | WO 2005/113230 A1 | 12/2005 |
| WO | WO 2015/084433 A1 | 6/2015 |
| WO | WO 2017/056006 A1 | 4/2017 |

* cited by examiner

LAMINATE CELL CONSTRUCTION SYSTEM

CROSS-REFERENCE TO RELATED APPLICATIONS

This application is a national stage patent application of PCT/IB2016/055782, filed on Sep. 27, 2016 entitled "LAMINATE CELL CONSTRUCTION SYSTEM" which claims priority from Mexican Patent Application No. MX/a/2015/013769, filed Sep. 28, 2015 both of which are incorporated by reference in their entirety.

FIELD OF THE INVENTION

The present invention belongs to the field of construction systems, whether in terrestrial, aeronautics, maritime architecture, or the like.

The present invention is described as a construction system for building floors, roofs, walls, etc. Specifically, the present invention is related to a construction system with structural elements that allow it to be self-supportive and distribute stress in all directions in order to obtain several and notable advantages compared to other current systems of analogue purposes. The present construction system is based on elements with a new geometrical shape called "laminate cell", comprised of bent rotational hyperbolic segments whose characteristic functions have been modified to obtain an advantageous industrial result as compared to other systems. The term "laminate cell" derives from "cell": elemental unit of a body; and "laminate sheet": object where surface area is greater than its thickness. So for the purposes of the present invention, we define a "laminate cell" as a hollow structural element made of a very thin, laminated sheet that takes a determined shape.

BACKGROUNDS OF THE INVENTION

Publications in the known prior art that are relevant and related to our invention are published here. It is worth noting that in all cases, said publications refer to stages different from the evolution of the current invention. Also, there are no existing publications of the last and most important stage, when same the current invention was finished and it was possible to determine the essence of its operation to the full extent. Therefore, the following publications may not be considered as impediments for the present patent application.

Similarly, other products that currently share certain similarities with the present invention include integrated panels with thin laminate sheets in space, pertaining to the technology of panels for structural use assembled in space or sandwich panels.

As a first example thereof, there are sandwich panels (Honeycomb) comprised of very thin laminate plane strips (paper, aluminum, plastic, etc.) which are joined to form hexagons when deployed and are later covered by parallel layers of thin laminate sheets. They are similar to the present invention only in the sense that they have two end plates and structural elements attaching them together, but such elements are and operate in ways that are totally different to those presented by our invention.

As a second example, there are the Nanocore panels, which have an appearance similar to our invention but differ in key aspects. The shafts of the Nanocore panels, that are the origin of said structure, do not have continuity on their end plates which prevents them from transmitting stress in all directions towards the remaining structure. Also, the structural element's shape is similar to two quadrangular or truncated tapered pyramids joined by their apexes and is unlike the present invention where modified hyperboloids are used. Therefore, by not having a double curvature shape, the Nanocore panels make the internal work and stress transmission completely different from the present invention.

There are also space structures or space frames, which are comprised of members or bars which are subject to longitudinal compressive or tensile forces and are placed in orthogonal planes. In said systems, the different bars are provided in oblique positions relative to each other and the assembly forms a planar cap or panel which fits to the cubic constructive shapes. However, they may also be in curved planes. When they have a curvature, cylindrical shapes are produced. If the surface is double curved, a dome is produced. The corrugated cardboard and the rectangular tube boards may also be considered within this technology.

Likewise, the beams are different kinds of structures, whose forces are distributed from the supports to the center of the beam. These kinds of structures are subjected primarily to bending stress of the external bending momentums.

Another type of structure are joists, which are comprised of a steel rafter designed to support forces and stresses and to minimize weight.

Additionally, a frame is a structure comprised of an assembly of linear pieces (wooden or metal) assembled together. Frames are used to support the cover roof of some buildings. The cover arrangement to one, two, three, four or more gables logically influences the characteristic of the frame that must support it. Typically, frames are structurally flat lattices, although there are other kinds of frames that are not latticework.

In this respect, the main difference of the present invention with the aforementioned assembled in space-structures is that in the present invention, stress is transmitted in all directions but in all the other cases it is not.

A review of the prior art indicates that the use of a construction system allowing self-support and the distribution of stresses in all directions, has not been used in the past.

Within the backgrounds and references, it is important to note document MX 9502477, owned by the same applicant, wherein an intermediate development stage focused on a structural element and not on a construction system as in the present invention, is shown. The main difference between the present invention and the structural element of document MX 9502477 corresponds to the creation of bent hyperbolic caps that close said structural elements and which are in charge of transmitting the main stress in the structural system.

For instance, European Patent 0549499 discloses a triangular device for floors to produce sandwich-like panels obtained by providing two series of rigid elements having tapered head profiles between two parallel plates such that the elements arranged in a staggered way in one of them are inserted between the elements arranged in a staggered way in the other. Unlike the present invention, the elements disclosed in patent EP0549499 have a triangular shape instead of a hyperboloid shape. Furthermore, they do not have a hyperbolic cap that closes said structural elements and which is in charge of the transmission of the main stress in the system.

German Patent Publication 10200800751 A5 discloses a core structure preferably comprising deep embossing films which have protrusions shaped as cones or tapered pyramids and which are connected to each other in multiple layers to cover surfaces. Said structure, disclosed in application DE 10200800751 A5, is the most similar to the one mentioned in the present invention. However, the structure of the German Application does not have hyperbolic caps. Consequently, there are no angles formed on its points of attachment, which results in the structure not being able to transmit the main stress in the system, such as in the present invention.

United States Patent Publication 3025935 A discloses a device of a construction panel comprised of a plurality of tapered elements for the production of sandwich-like panels. As it may be noted, said panels do not have a hyperbolic cap. Furthermore, as they do not have a hyperbolic shape, the main stress may not be transmitted in the system as in the present invention.

None of the documents describe a cellular construction system that uses a plurality of hyperboloid laminate cells with rectangular ends and hyperbolic caps, defining angles between each other to form self-supporting structures that allow for the transmission of stresses in all directions resulting in a lightweight, low cost, and highly resistant structure. There is a need for a construction system that overcomes all the drawbacks of the systems developed in the past.

SUMMARY OF THE INVENTION

According to the invention, there is proposed a new kind of construction system consisting of the attachment of structural elements arranged in such a way that when coupling one to each other it allows it to form lightweight and highly resistant structures.

The construction system of the present invention is comprised of a type of hollow brick called a laminate cell, shaped in the form of a modified hyperboloid; which, when working together, result in a structural system with integrated cover which can absorb and transmit stresses in all directions and orientations. Said laminate cells comprise a construction system considering that due to the shape of the laminate cells when being attached together, they form structures with integrated cover which are able to work together in all planes, directions, and orientations. Therefore, this allows them to interchangeably and simultaneously operate as floors, walls, and roofs, thus generating all the elements that integrate a building or body without the need to use additional elements other than laminate cells.

A laminate cell is the elemental unit of this construction system. It is a hollow structural element made of a very thin, rigid, laminate sheet that takes a new geometric shape derived from modified hyperboloids. This shape, that gives purpose to the present invention, is a composition resulting from the combination of hyperbolic segments and the bends produced on its attachment points. From this shape, two new tensile stresses are generated, one hyperbolic and the other one circular, produced by the double curvature of the shape which causes the tightening of the straight generatrices of the hyperboloids.

The hyperboloid walls have a minimal thickness, therefore requiring a lot of pressure to flatten them, which provides a higher spacing strength (i.e., more cohesive than repulsive force). This cohesive force is determined by the material used, however, the shape of the present laminate cell increases its cohesive force thanks to the implementation of super short columns resulting from the intertwining of the straight generatrices, which prevent its failure to cohesiveness.

When traveling to the inner part of these hyperboloid walls, stresses have a very special behavior. The wall thickness is not enough for there to be a resistant torque in the laminate cell, the suppression of the resistant torque is achieved in the system due to the thinness of the material due to the double curvature shape generated by the straight lines that intertwine causing the tensile and compressive stresses to work in a same line and simultaneously, the tensile stress happens at the same time that the compressive stress along the hyperboloid generatrices in a way that when there is tension, they are compressed, and when there is compression, they are tensed. The double curvature causes tightening and stiffening of the generatrices. Because of being intertwined with the remaining diagonals, the generatrices form a net of millions of straight line micro-segments or particles that each absorb a portion of the applied stress. As a result, the shape has an enormous capacity to absorb stresses, where the endurance limit is the forces that hold together the molecules of the material being used.

This phenomenon allows the dimensional stability of the construction system because when there is a tensile stress able to deform the system, a compression stress occurs at the same time which counteracts it, and vice versa, therefore this phenomenon does not allow the flow of the material with which each laminate cell is made. If you apply a force that increases, the material is compressed and tensed to the point of making the material more compact, causing it to be transformed, making it harder and more resistant.

OBJECTS OF THE INVENTION

The main object of the present invention is to provide a cellular construction system that allows preparing the slabs and walls of a building for the passage of installations of all kinds, especially air conditioning, without affecting its strength and without using additional resources such as false soffits or double floors.

Another object of the present invention is to provide a highly resistant cellular construction system that takes advantage of stress distribution in all directions to make more efficient the use of the material by using only what is needed.

Another object of the present invention is to provide a cellular construction system which is very lightweight due to the usage of very thin laminate sheets, causing its usage to be exploited in fields like aeronautics where fewer materials used notably lighten the weight of the construction.

Another object of the present invention is to provide a cellular construction system that employs few materials in its manufacture thereof, resulting in a low cost.

Another object of the present invention is to provide a cellular construction system which resists incidental stresses such as telluric movements, winds, and floods. This is due to the work of its structure which allows it to be prepared for any change in the direction of the stresses.

Another object of the present invention is to provide a cellular construction system that offers dimensional stability where the internal work of the laminate cells takes advantage of the emerging property of tensile-compression simultaneity for opposing the dimensional movements produced by temperature changes.

Another objective of the present invention is to provide a cellular constructive system that implements the use of thermoformable materials for its manufacture because the structure of each laminate cell counteracts the flow of the material.

Another object of the present invention is to provide a cellular construction system that allows the transportation of fluids by providing an internal space within its structure and by being fitted with inertia breakers from the laminate cell shafts. This is appropriate for the transportation, for example, of liquids, such as in the case of airplane wings.

Another object of the present invention is to provide a cellular construction system that allows for its relocation since, if necessary, it may be removed without any damage, breakage, or deformation.

Another object of the present invention is to provide a cellular construction system which may be used in any kind of construction due to properties offered by said construction system, thus allowing for the efficient fitting in the terrestrial, maritime or aeronautical construction field.

BRIEF DESCRIPTION OF THE DRAWINGS

The invention is described with reference to attached Figures in which.

DETAILED DESCRIPTION OF THE INVENTION

Referring to the Figures, the laminate cell construction system of the present invention is described, which is highly efficient for the manufacturing of construction elements such as high resistance, lightweight and low cost floors, roofs, walls, etc.

The present invention proposes a new kind of construction system consisting of the attachment of structural elements called laminate cells, which by intertwining one to each other produce the construction elements required to form a building or body.

Figure 1:
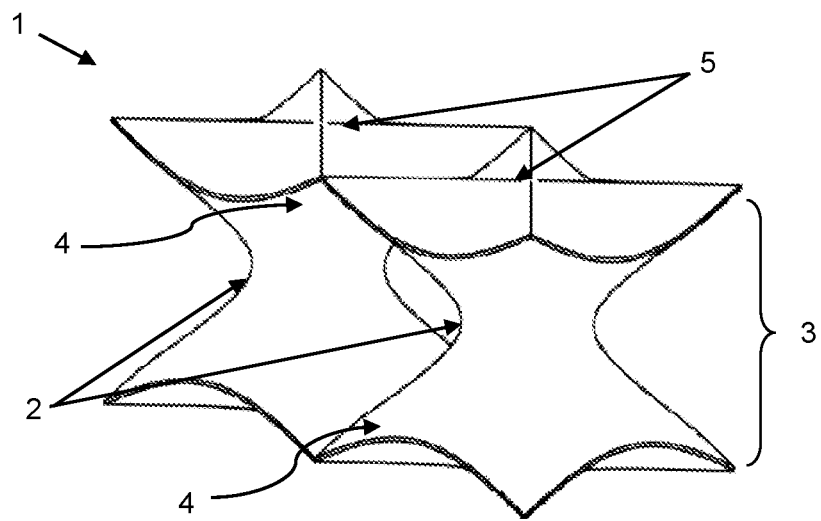
FIG. 1 is a perspective view of the standard laminate cells used in the preferred embodiment of the construction system.

FIG. 1 shows a perspective view of the laminate cells used in the preferred embodiment of the present invention. Each laminate cell (1) has a hollow main body (2), is manufactured into a very thin, laminate sheet and substantially modified hyperboloid-shaped which, when working together with other laminate cells, produces a construction system with integrated cover that absorbs and transmits stresses in all directions and orientations.

The present invention is considered a construction system considering that when the laminate cells, due to their shape, are attached together, they form construction systems with integrated cover that may work together in all planes, directions, and orientations. Therefore, they may be used interchangeably and simultaneously for the construction of floors, walls, and roof. Thus, all the elements that integrate a building or body are generated therewith without the need of using additional elements other than laminate cells (1).

As shown in FIG. 1, the main body (2) of each laminate cell (1) is hyperboloid-shaped (i.e., forming two hyperbolic arches (3) in the vertical plane whose top and bottom edges are projected upwards towards the outside for the top edge and downwards for the bottom edge) forming two surfaces called shafts (4). The laminate cell also contains a hyperbolic cap (5), where both top and bottom covers both shafts (4) by its free end.

Figure 2:
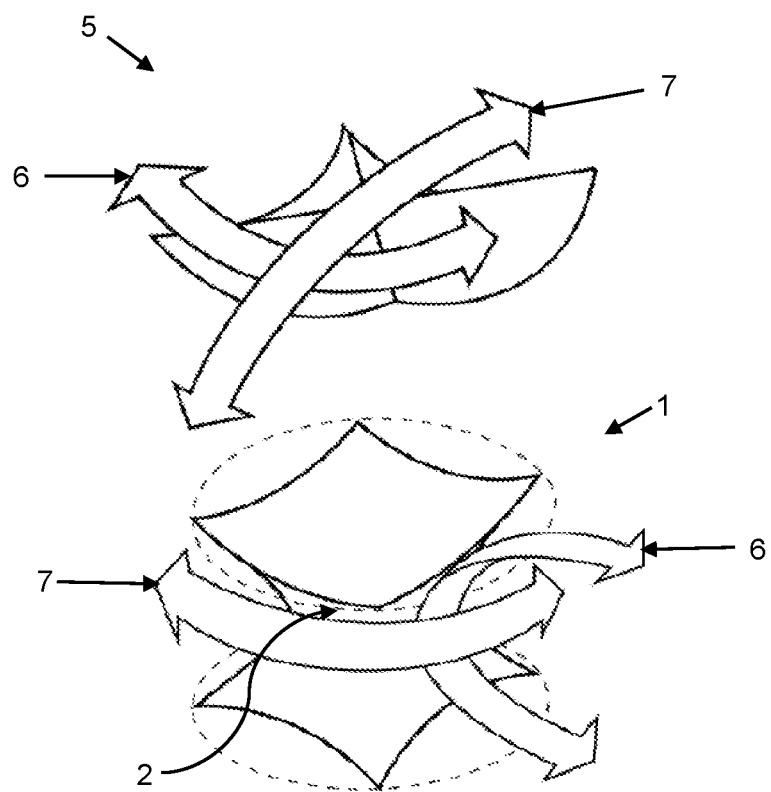
FIG. 2 is an exploded view of the standard laminate cells of the construction system.

FIG. 2 shows an exploded view of the laminate cell (1) and cap (5), wherein one may analyze how and why the laminate cell (1) works, which involves the deep examination of the structural elements comprising the laminate cell (i.e., the laminate cells (1), as well as the way they interact with each other, work together to generate a structural system and consequently, a construction system.)

The laminate cell (1) is the main unit of this construction system, as it is a hollow structural element, made of very thin laminate sheet, which adopts a new geometric shape derived from hyperboloids but with certain modifications. Both the main body (2) and the cap (5) shapes are the purpose of the present invention, as they result from the combination of hyperbolic segments and the bends produced by the attachments thereof. As shown in FIG. 2, two new tensile stresses are generated from this shape, one hyperbolic (6) and the other one circular (7), produced by the double curvature pertaining to the shape, which are the ones causing tightening of the straight generatrices of the hyperboloids. As previously mentioned, the particles whose dimensions are equal to the thickness of the material used have a very particular characteristic which is produced because of the use of thin walls which avoid generating resistant torque when applying forces thereto. Additionally, the micrometric dimensions thereof cause the compressive and tensile forces to be able to work only on the same plane, thus causing the shear stress to be the only force usable since there is not enough separation between the outer face and the inner face in order to produce momentums. Also, due to the intertwining of the generatrices that generate the main body (2), each particle also has the double curvature of the hyperboloids, which in turn causes the material to be compressed until compacted, which causes it to be pinned between both forces and prevents it from flowing anywhere else. This makes it extremely difficult for each particle to fail and the only way possible for failure to occur is when the stress exerted upon each of the particles exceeds the cohesive strengths that hold together the molecules of the material.

Figure 3A:
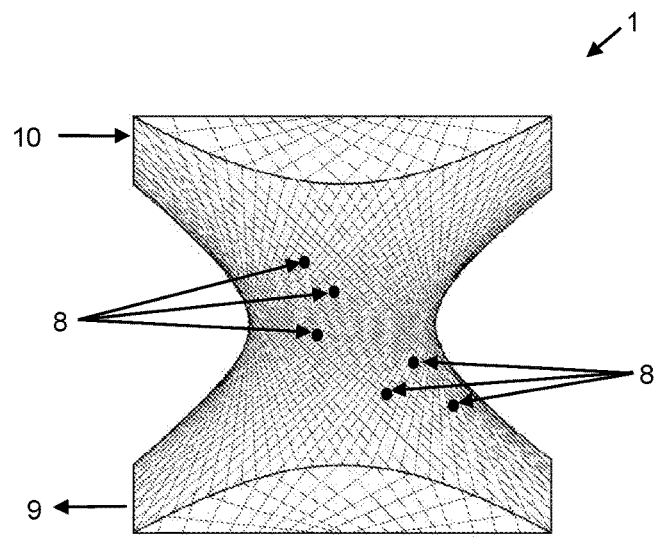
FIG. 3a is a schematic view of the microscopic arrangement of each laminate cell of the construction system.

FIG. 3a shows a microscopic arrangement of each laminate cell (1) of the present invention. As mentioned previously, the walls comprising the hyperboloid have a minimum thickness due to the fact that when the stresses travel to the interior they have a very special behavior, as said thickness is not enough for a resistant torque to exist because they only work with shear stress. Such characteristics, along with the double curvature from the shape of the hyperboloid (shafts 4), are generated by a plurality of particles (8) defining hyperboloid generatrices which intertwine throughout the entire laminate cell (1), and produce the tensile (9) and compression (10) stresses working on a same line and simultaneously. It is worth noting that each laminate cell (1) per se cannot reach said effect because the tensile (9) and compression (10) stresses exerted by each adjacent laminate cell (1) are required, thus fulfilling its function in the system.

Figure 3B:
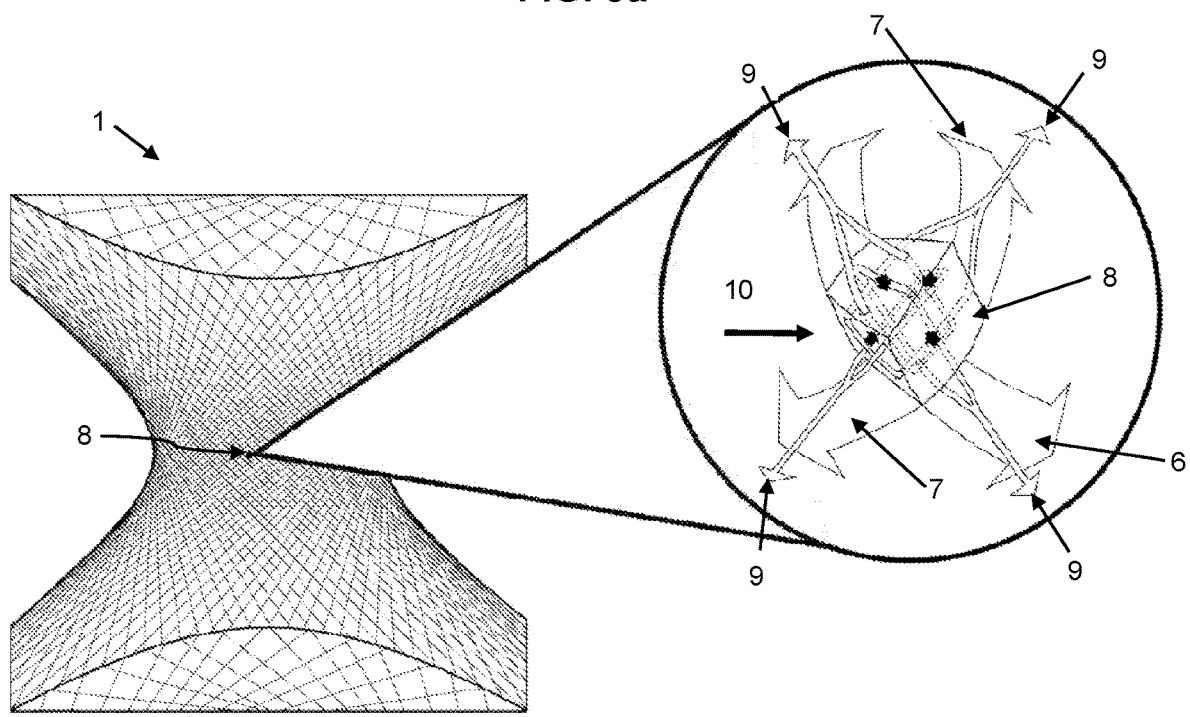
FIG. 3b is an exemplary representation of the action exerted by the hyperbolic and circular tensile stresses, as well as by the compression stresses on the particle.

FIG. 3b shows an exemplary illustration of the action exerted by the tensile (9) and compression (10) forces upon the particles (8) defining the laminate cell body generatrices (1). As it may be appreciated, the hyperbolic (6) and circular (7) tensile forces exerted by the double curvature over each particle (8), apply a clamp force which tightens the straight guidelines and simultaneously transmits the tensile and compressive stresses, thereby causing cutting stresses that generate a greater cohesion and prevent the flow of the material.

Figure 3C:
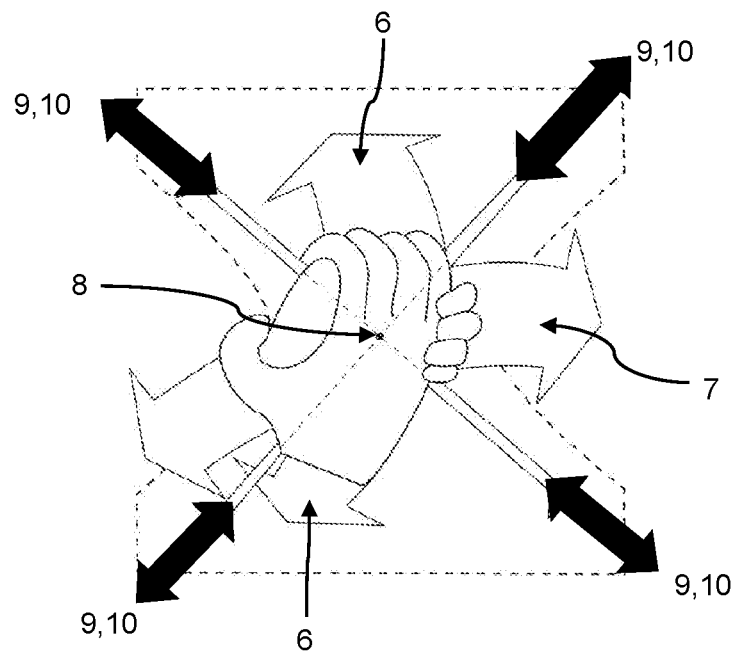
FIG. 3c is an exemplary schematic figure of how tensile and compressive stresses act over the laminate cells of the construction system.

Moreover, FIG. 3c is an exemplary illustration of how the tensile and compressive stresses act internally inside each laminate cell (1) comprising the construction system of the present invention. FIG. 3c schematically shows the behavior of the stresses in a laminate cell, wherein the stresses are represented by a pair of hands holding each other, simulating the circular (7) and hyperbolic (6) tensile stresses of the double curvature (4), which tighten and stiffen the guidelines that generate the laminate cell, which when intertwining with the other particles (8) of the generatrices, conform a net of millions of straight line micro-segments or particles, making each one absorb a portion of the stress exerted. Thus, the proposed laminate cell (1) shape has an enormous capacity to absorb stresses, making the forces, that hold together the molecules of the material being used, the endurance limit.

As a result of the intertwining of the particles (8) of the straight generatrices forming the laminate cell (1), a dimensional stability is obtained. This occurs since a diversity of small segment or tridimensional particles are generated whose length is equal to thinness of the thickness thereof. When these particles are tightened by the double curvature, they acquire emerging properties (in the straight generatrices) such as the simultaneous compression (10) and tensile (9) stresses that are performed when, by compressing, tension takes place and by tensing, compression takes place. This provides dimensional stability and the capacity of fitting to incidental stresses due to the inversion thereof; such as: temperature, vibrations, wind, earthquakes, water pressure, movement, etc. Due to this emergent property, the compression stresses (10) equal the tensile stresses (9), producing the same tensile and compressive strengths. Similarly, as the tensile and compressive strengths in the laminate cell (1) are the same, a considerable advantage is given compared to the construction systems disclosed in the prior art, as those materials have different compression and tensile strengths, unlike the present invention wherein both forces are equal because of the shape of the laminate cell (1). The shape is the reason for this phenomenon, the material is confined and when the material is compressed, it is not able to flow, causing an increase in the compression strength thereof until reaching the same tensile strength it has.

Figure 4:
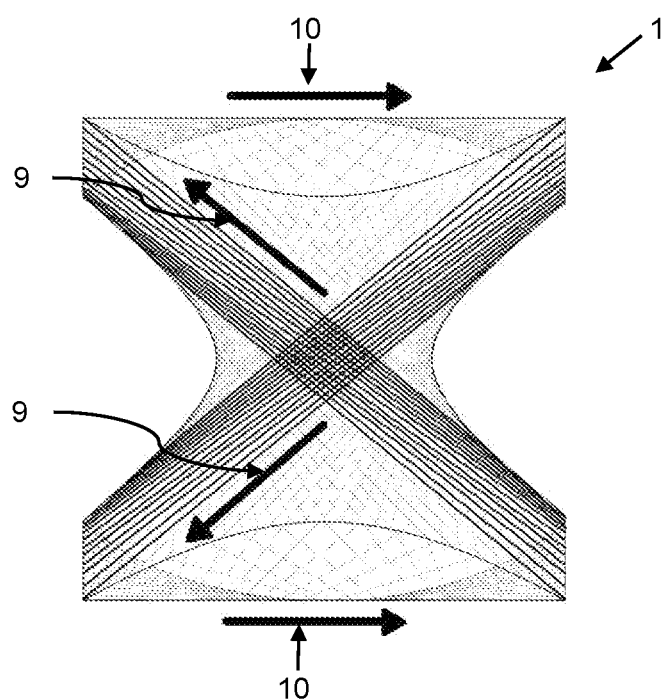
FIG. 4 shows the phenomenon of the forces acting on the laminate cells allowing for the dimensional stability of the construction system.

FIG. 4 shows an example of the phenomenon of the laminate cells (1) which allows the dimensional stability of the construction system since whenever there is a tensile force (9) that is able to deform it, a compression force (10) that counteracts this action exists, and vice versa. This prevents the material from flowing, avoiding the elongation thereof and providing a solid and lasting structure. Overall, this results in extending the useful life of the structure.

Figure 5:
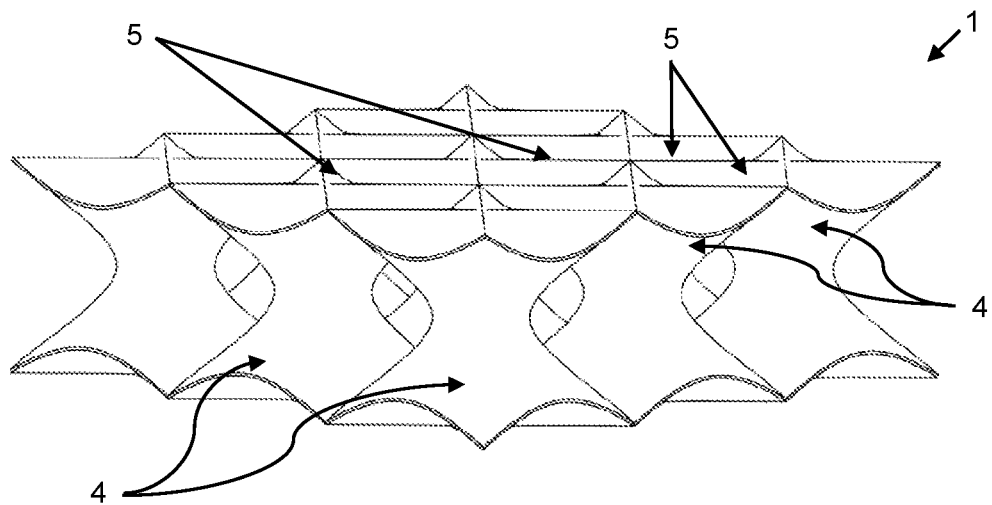
FIG. 5 shows a perspective view of the construction system using quadrangular or standard laminate cells.

FIG. 5 shows a perspective view of the construction system using quadrangular or standard laminate cells, corresponding to the preferred embodiment of the present invention (see FIG. 1). This corresponds to the base structural elements found in the entire construction system except for the places where the transmission of stresses between planes or closing edges is necessary (described below).

The quadrangular or standard laminate cells (1) corresponding to the preferred embodiment of the present invention comprise two main modifications to the hyperboloid. The first one consists in the shape of the main body (2) and the second one consists in the cap (5) which covers both shafts (4). FIG. 5 shows how the laminate cells (1) contact with each other through the ends of each shaft (4).

Figure 6:
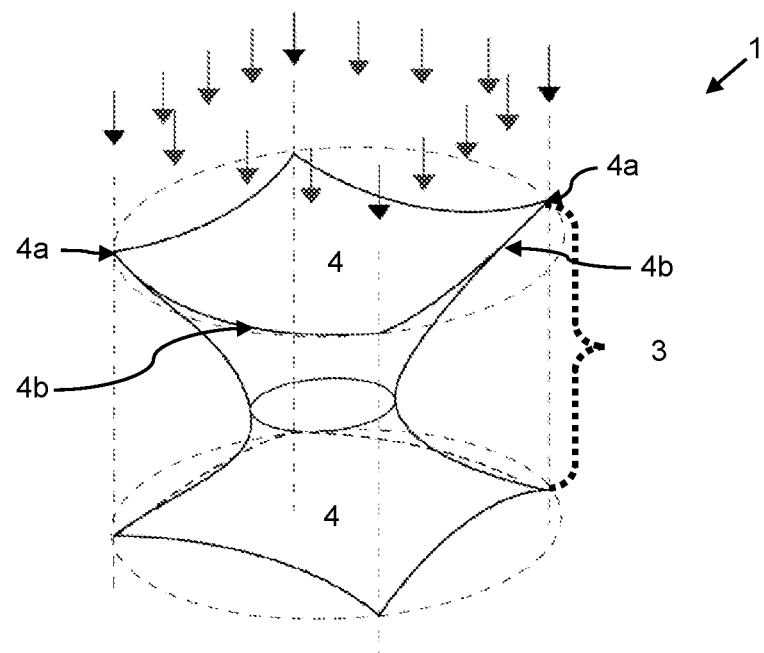
FIG. 6 shows the first modification made on the hyperboloid to generate the standard laminate cells.

FIG. 6 shows the first modification to form each laminate cell (1) through a vertical cut over the symmetry axis via a quadrangular shaped die (not shown), making each tip of the die square to match a point in the end circumference of the hyperboloid. When lowering the die, the resulting cut produces in each of the edges of the main body (2), a quadrangular segmented hyperboloid referred to as shaft (4) (see FIG. 1). Said shaft (4) is substantially square shaped at the ends of the hyperboloid, producing 4 tips (4a) attached through substantially curved shaped awns (4b). In turn, both shafts (4) are attached together with hyperbolic arches (3) on the vertical plane forming the main body (2). Thanks to the shape of said shafts (4), a plurality of laminate cells (1) may be attached through hyperboloids or shafts (4) in a quadrangular arrangement, which allows the existence of a continuous attachment throughout the length and width of all the structure (see FIG. 5). This also allows for each hyperboloid or shaft (4) to be closely related with each one of the others, a key factor for the transmission of stress in all directions and orientations of the entire system.

Figure 7:
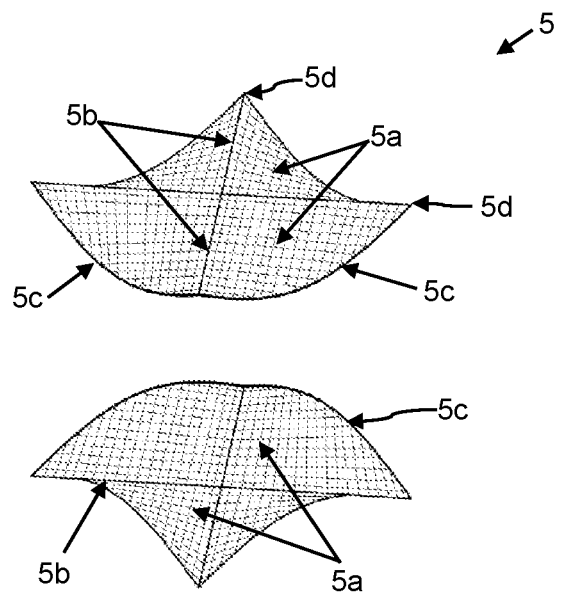
FIG. 7 shows the bent hyperbolic caps that close the standard laminate cells.

FIG. 7 shows the second major modification of the hyperboloid (1), which results in a sort of cap (5), comprised of four hyperboloid sections (5a) defining substantially curved awns (5c) attached in a crosshead of bends (5b) attached to four tips (5d). This cap (5) is located at both ends of the quadrangular segmented hyperboloid or shaft (4), producing bends along the hyperbolic arches resulting from the first modification. These caps (5) are the elements responsible for receiving the main outer stresses of the system (9), (10) and transmitting the stress to both the interior of each laminate cell as well as to the other laminate cells of the construction system.

It is worth mentioning that the transmission of stresses towards the inside of the main body (2) is performed through the crosshead bends (5b) formed in the cap (5) and through the bends (5c) formed when the cap attaches the shaft. This transmission of stresses is guided through the particles (8) of the straight generatrices which conform the hyperbolic sections of said elements towards the bends of the shaft (4) and within the shaft (4). The transmission of stresses to the other laminate cells is obtained by sending the stress through the diagonals of the hyperboloid sections (5b) produced as a consequence of the bent of the attachment of the 4 hyperboloid sections referred to above and which generate said caps (5). For a better understanding of this operation, the described mechanism may be compared with the work of an I-beam, wherein the cap corresponds to the flanges thereof, while the quadrangular hyperboloid or shaft (4) represents the web. The difference between the I-beam and the present system is that work is performed in all directions and orientations and not confined to only two directions as with the I-beam.

Figure 8:
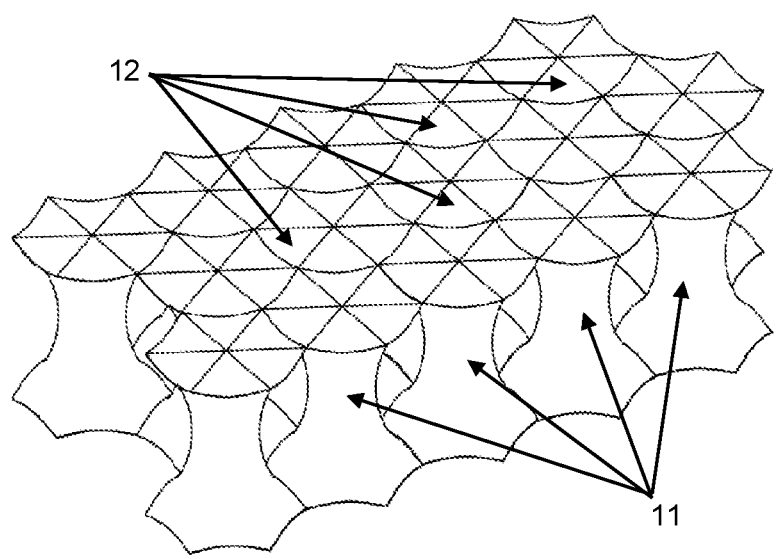
FIG. 8 shows a second embodiment corresponding to laminate cells in a hexagonal lattice arrangement.

FIG. 8 shows a second embodiment corresponding to laminate cells with hexagonal lattice (11) arrangement, which require a cap (12) to generate the resistant torque. In this case, no special pieces are required to perform the connections between planes. The hexagonal laminate cells (11) with a cap (12) have two modifications to the hyperboloid which are very similar to the standard laminate cells (1) of the preferred embodiment.

Figure 9:
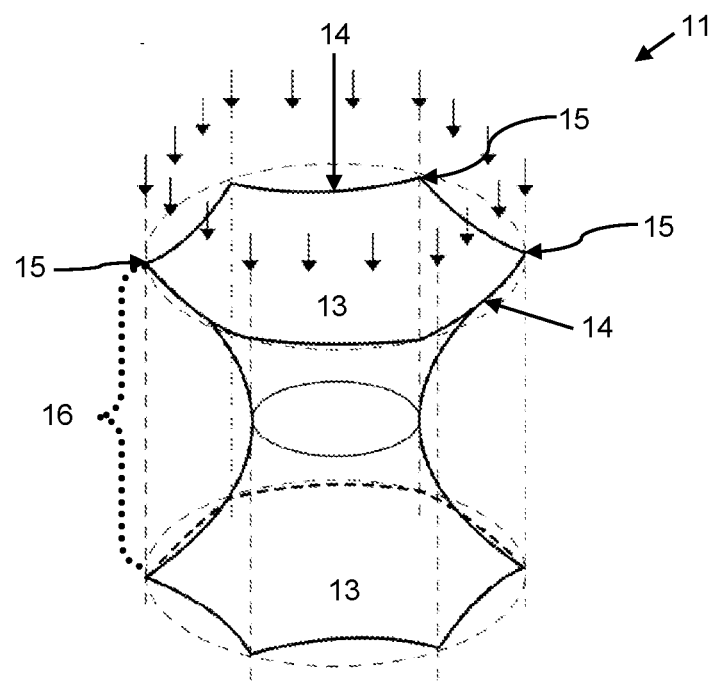
FIG. 9 shows the first modification made on the hyperboloid to generate the hexagonal laminate cells of FIG. 8.

FIG. 9 shows the first modification to the hyperboloid (11), which also consists of a vertical cut over the symmetry axis through a die but in this case of a hexagonal shape, each tip of the hexagon of the die matches a point in the end circumference of the hyperboloid (see FIG. 8). The resulting cut produces a hexagonally segmented hyperboloid which is also referred to as shaft (13). Said cut causes six curved awns (14) at the ends of the hyperboloid consisting of six tips (15). Both shafts (13) are attached together through hyperbolic arches (16) on the vertical plane of the main body (11). Because of said cut, modified hyperboloids or shafts (13) may be attached together in a hexagonal arrangement, which allows for the existence of a continuous attachment throughout the length and width of the entire structure. Also, each hyperboloid or shaft (13) is closely related to each other, a key factor for the transmission of stresses in all directions and orientations in the system.

Figure 10:
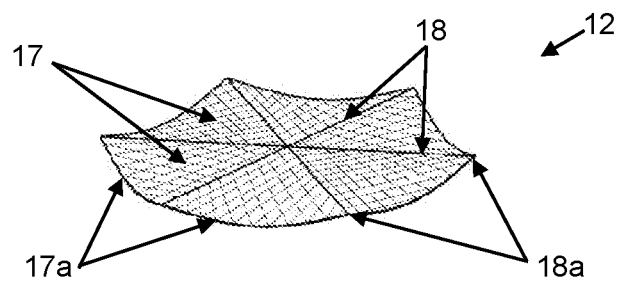
FIG. 10 shows the bent hyperbolic caps that close the hexagonal laminate cells of FIG. 8.
Figure 10:
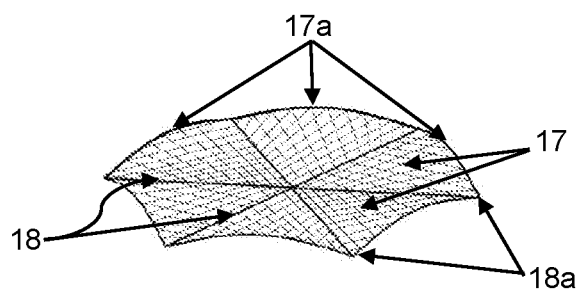

FIG. 10 shows the second modification which also consists of a sort of cap (12), conformed in this case by six hyperboloid sections (17) with substantially curved awns (17a), attached in a crosshead of bends (18) and attached to six tips (18a). This cap is equally located at both ends of the hexagonally segmented hyperboloid or shaft (13) (see FIG. 8) and attached to the shaft providing bends along the hyperbolic arches (16) resulting from the first modification. These elements play the same role in the hexagonal laminate cell as those corresponding to the standard laminate cell caps explained above.

Figure 11:
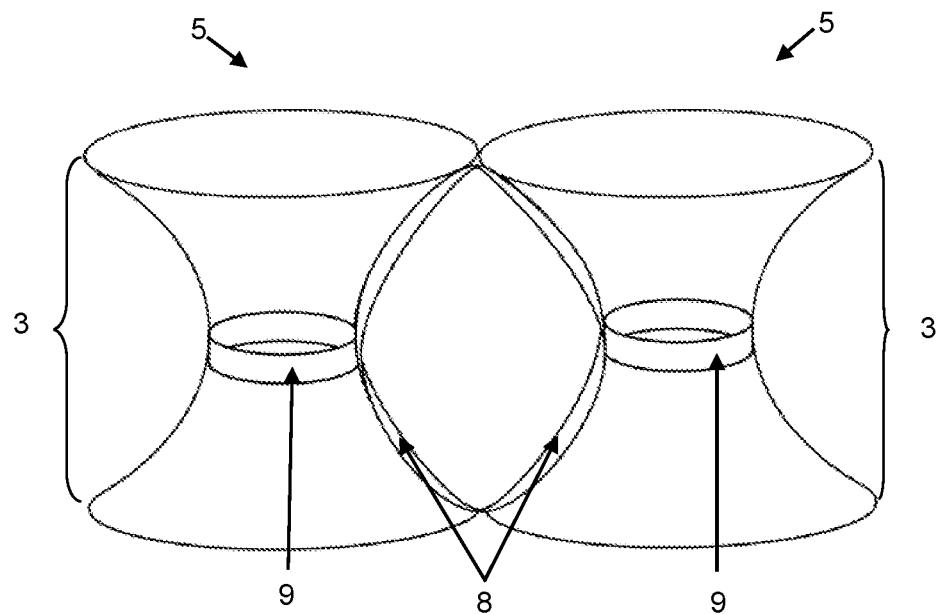
FIG. 11 shows hyperbolic and circular clamps operating as stiffeners in each laminate cell of the construction system of the present invention.

FIG. 11 shows the hyperbolic (8) and circular (9) clamp forces operating as a tightening element in the attachments. This double curvature is present in each laminate cell (1) when the hyperbolic arches (3) from each laminate cell are connected with the next adjacent laminate cell. This characteristic allows for the systematic continuity in the transmission of stresses in all directions and planes within the construction system.

Figure 12:
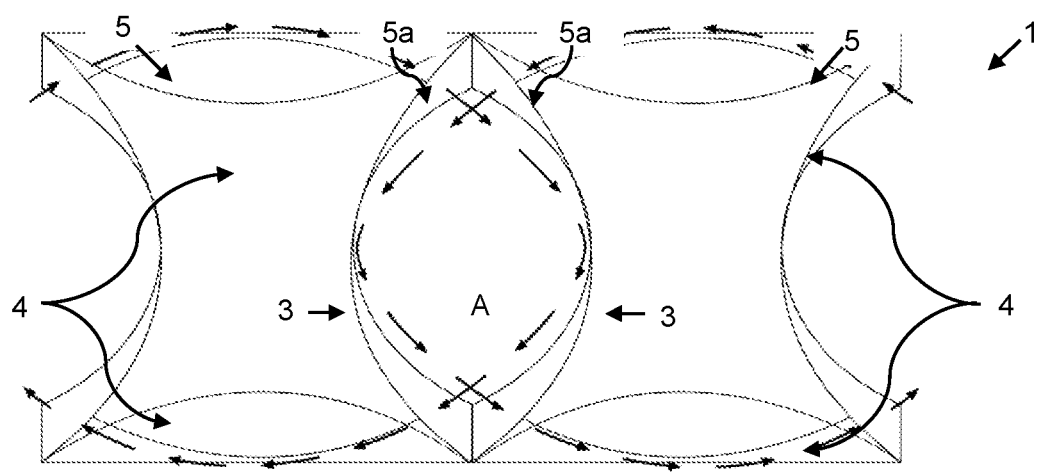
FIG. 12 shows a cross-sectional view where the attachment between the standard laminate cells may be seen.

FIG. 12 shows a cross section where the attachment between the standard laminate cells (1) may be appreciated. As shown in FIG. 12, the top and bottom shafts (4) of each laminate cell forming the structure are attached together forming a hyperbolic clamp force (A) which is defined by the attachment between the hyperbolic arches (3) of each laminate cell (1). Here, the "F" forces exerted on each laminate cell (1) are transmitted from the hyperbolic section (5a) of the cap (5) towards the next cap (see FIG. 13), and at the same time, to the inside of the main body (2) through the hyperbolic arches (3), thus distributing the forces in all directions on the entire structure.

Figure 13:
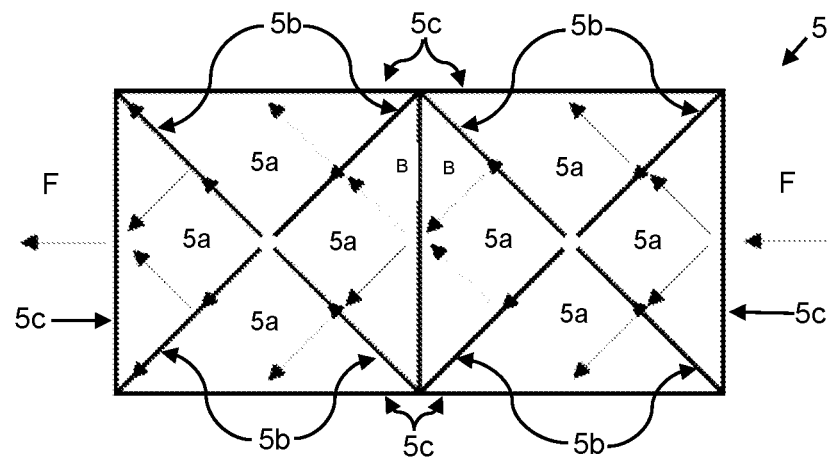
FIG. 13 shows a top view of the attachment performed between the standard laminate cells.

FIG. 13 shows a top view of the attachment between the standard laminate cells (1). As shown in FIG. 13, each cap (5) has four hyperbolic zones (5a) defining curved awns (5c) formed through the bends of the crosshead (5b). Each hyperbolic zone (5a) of a cap (5) contacts each zone (4a) of the caps (5) of the adjacent laminate cells, forming hyperbolic zones (B) that transmit an "F" force applied towards the entire structure through the crossheads (5b). As FIG. 13 shows, the cap (5) has a critical role within the structure of each laminate cell because it transmits the "F" forces both between the caps (5) as well as between the laminate cells (1) (see FIG. 12), achieving the distribution of stresses throughout the entire structure and in all directions.

A series of modifications has been made to the hyperboloids to produce the laminate cells (1) of the present invention, which vary depending on the location and use given thereto within the construction system. For example, the modifications are not the same if the laminate cells (1) are located at the rim of a building or body, if they are found at the corner thereof, or if they are found at the attachment between a vertical plane and a horizontal one. These modifications respond to the need of transmitting the outer stresses acting upon the system with the same efficacy towards the entire structure regardless of the plane or location where the stresses are exerted. As a result, the laminate cell assembly (1) operates as a system in order to achieve the result that each element works and absorbs a portion of the exerted stress. That is, the stress applied on any point of the construction system is transmitted with such efficiency towards the entire structure and it is pulverized in small portions in order to be absorbed by all of the structural elements comprising the building or body. This allows the building or body to obtain an optimal strength and capacity to absorb incidental or unplanned stresses. This occurs because the building or body works as a single unit enabled to absorb and transmit stresses regardless where or how they are exerted.

The following Figures show the special form laminate cells (1), as mentioned above, which have modifications depending on the role they play in the system. The existing variants are listed below.

Figure 14:
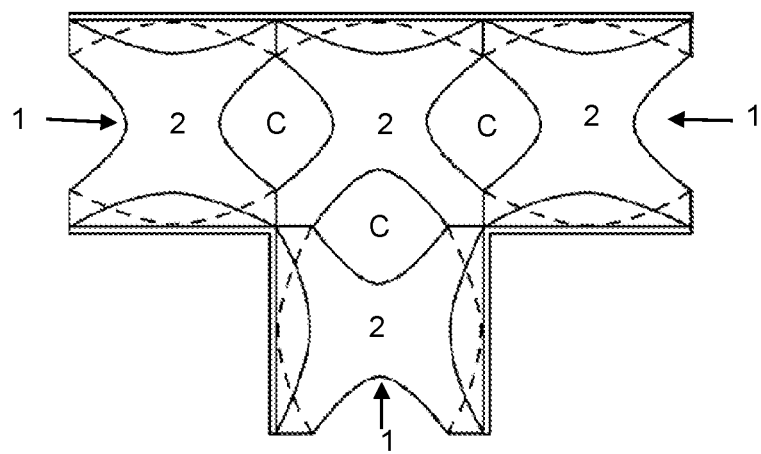
FIG. 14 shows a "T" laminate cell for the attachment of floors or roofs with inner walls.

FIG. 14 shows a "T" laminate cell used for connecting roofs or floors with inner walls. As shown in this Figure, each laminate cell (1) keeps the shape of the main body (2) in order to form three hyperbolic zones (C) between the laminate cells (1) wherein the coupling takes place, achieving the spreading of the "F" force over the main body (2) of all the laminate cells (1) defining the structure.

Figure 15:
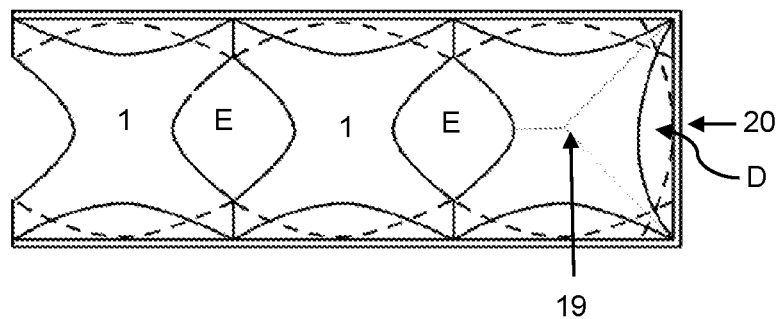
FIG. 15 shows a laminate cell used as an edging for the free edges in floors or walls.

FIG. 15 shows a laminate cell used as an edging for free edges in floors or walls. For this embodiment, the shape of each laminate cell (1) is the same, except for the last laminate cell (19) used, which has a third cap (20). This third cap defines a hyperbolic zone (D) which, along with the other hyperbolic zones (E), spreads the "F" force in all directions over the entire structure.

Figure 16:
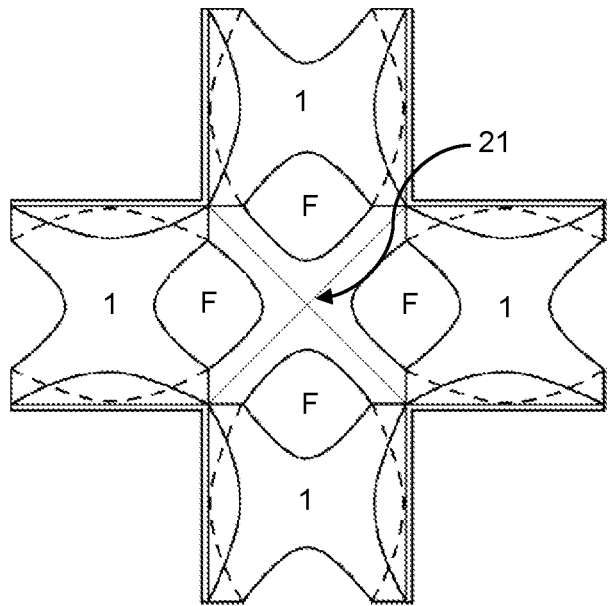
FIG. 16 shows the laminate cell used as the attachment of a wall segmented by a floor.

FIG. 16 shows the laminate cell used as a wall joint segmented by a floor. This embodiment uses a main body (21) which has the same hyperbolic configuration as the one mentioned for standard (1) and hexagonal (11) laminated cells. A difference is that the main body (21) defines, along with the laminate cells (1), four hyperbolic zones (F) which spread the "F" force applied to any laminate cell in all directions over the structure.

Figure 17:
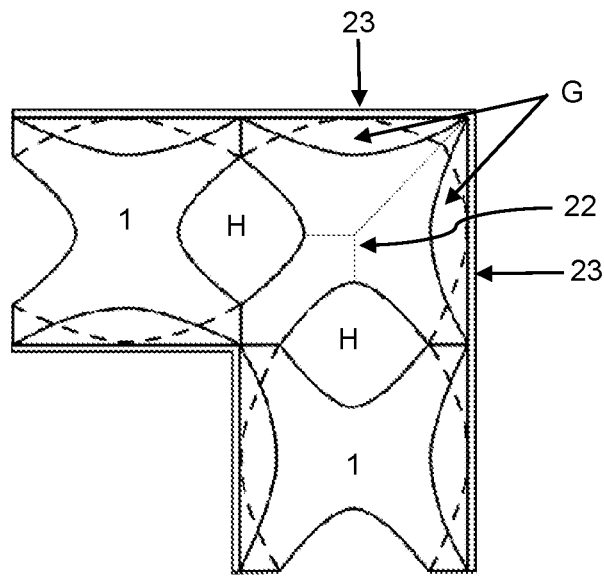
FIG. 17 shows the laminate cell used as the attachment of outer walls with the floor or roof edges.

FIG. 17 shows the laminate cell used as a joint of outer walls with the edges of the floors or roofs. This embodiment has a laminate cell similar to the one used for endings (see FIG. 15). A difference is that the main body of said laminate cell (22) comprises two caps (23) that define hyperbolic zones (G). Along with the hyperbolic zones (H) formed with the adjacent laminate cell assemblies (1), which together transmit the "F" forces over the entire structure.

Figure 18:
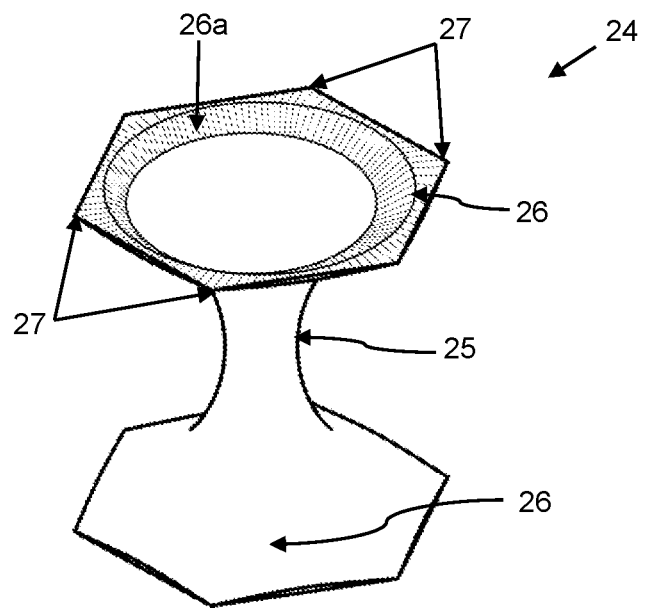
FIG. 18 shows a third embodiment corresponding to laminate cells in a hexagonal lattice arrangement.

FIG. 18 shows the third embodiment of the hexagonal laminate cells corresponding to the other kind of base structural laminate cells (24). It is worth mentioning that this base structural laminate cell (24) also has a hyperboloid shaped-main body (25) defining a shaft (26) on each free end of the main body (25). These shafts (26) have a substantially circular end (26a) projecting outwards to the point that they make a substantially flat surface with six outer flanges (27). It is important to mention that the laminate cell here (24) works in the same way as the laminate cells mentioned above in the exemplary embodiment of the present invention. Therefore, the structural characteristics in this third embodiment are the same except for the caps. Each laminate cell (24) of the aforementioned third embodiment acts as an elemental unit of the construction system because it is also a hollow structural element made of very thin sheet providing a higher strength. Consequently, the hyperbolic and circular tensile stresses, produced by the double curvature of the shape itself, generate the tightening of the straight generatrices (25a) of the hyperboloids. Likewise, the micrometric dimensions of its particles cause the compressive and tensile forces to only exist in the same plane, making only shear stress possible since there is not enough separation between the outer face and the inner face for producing momentums. Furthermore, due to the shape of the main body (25) and the intertwining of its generatrices (25a) (see FIGS. 20 and 21), each particle also has the double curvature of the hyperboloids. This characteristic causes the material to be compressed until compacted, which causes it to be pinned between both forces and prevents it from flowing anywhere. This results in making it extremely difficult for each particle to fail. Consequently, the only way for failure to occur is when the stress exerted over each of the particles supersedes the cohesive forces that hold together the molecules of the material.

Figure 19:
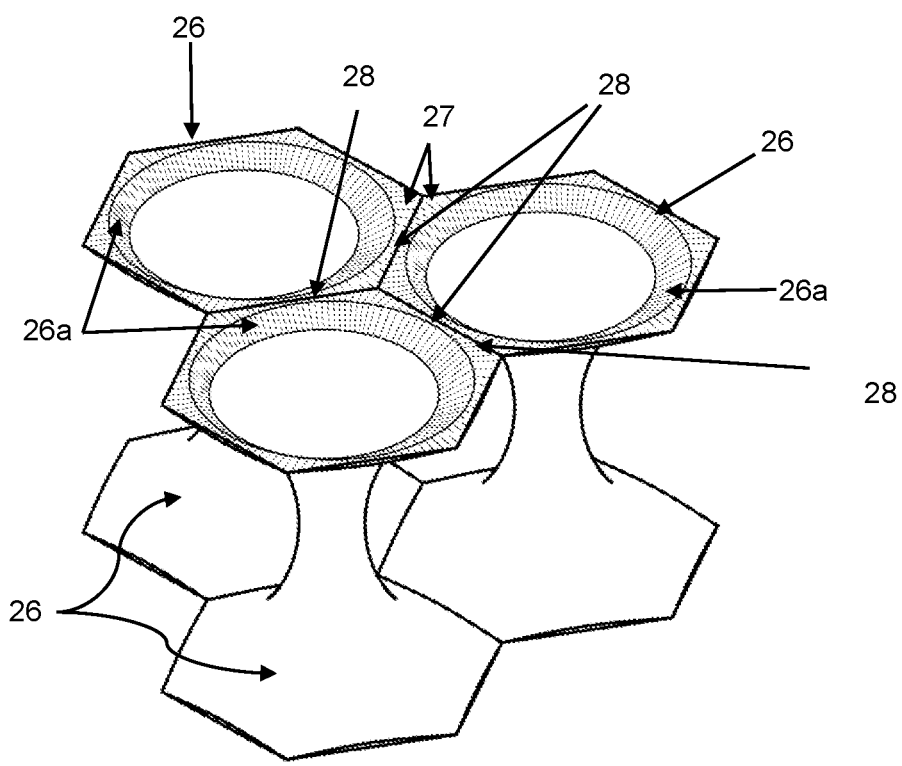
FIG. 19 shows a structure comprised by the hexagonal laminate cells of FIG. 18.

FIG. 19 shows a perspective view of a structure made by arranging the structural elements under a hexagonal arrangement of hexagonal laminate cells (24). This is used when more economy is required because less amount of material is used in the system when they are attached together. This embodiment has the structural element corresponding to the cap in both the exemplary embodiment and the hexagonal with cap embodiment integrated in the end bends and flanges thereof. In order to attach the shafts (26), it is only necessary to perform cuts to the laminate cells (24) located at the rims. The cuts are conducted in such a manner that they can be attached together using the flanges (27). Unlike embodiments 1 and 2, the "F" forces absorbing the outer stresses in this embodiment are spread through the 6 flanges (27) formed at the ends of the shafts (26). When the flanges couple to the shaft (26) of the adjacent laminate cell, curved edges (28) that transmit the stresses in all directions over the entire structure are formed.

Figure 20:
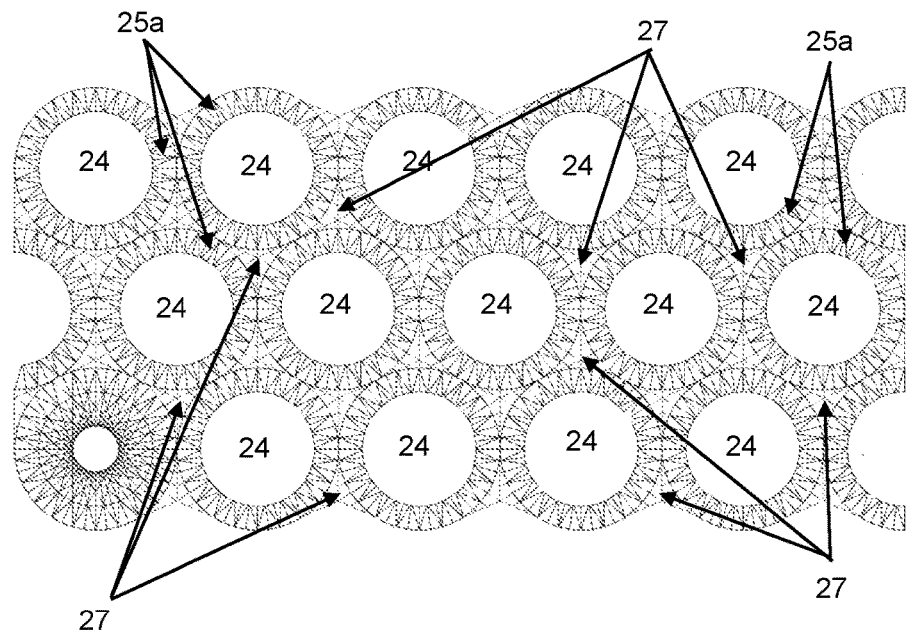
FIG. 20 shows a top view of the attachment of the hexagonal laminate cells of FIG. 18.

FIG. 20 shows a top view of a structure formed by a plurality of laminate cells (24). The figure shows how the six flanges (27) of each laminate cell (24) come into contact with the flanges (27) of each adjacent laminate cell (24) so that the main body generatrices (25a) follow a continuous path over the entire structure. This transmission of stresses is performed in the same way as in the cap of the other two embodiments of the present invention.

Figure 21:
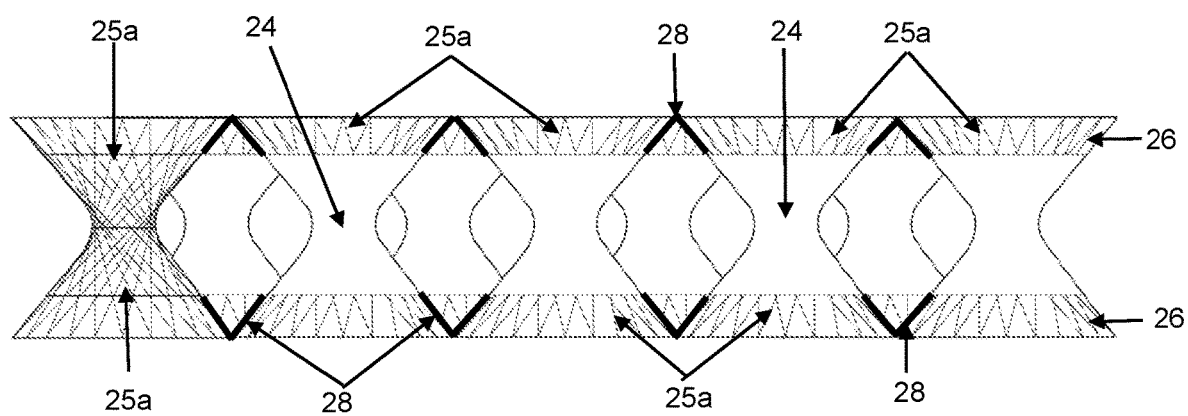
FIG. 21 shows a longitudinal cross-section view of the hexagonal structure of FIG. 18.

FIG. 21 shows a frontal view of the structure shown in FIG. 20, where the generatrices (25a) follow a straight path along the entire main body. Additionally, the generatrices (25a) of each laminate cell (25) contact the generatrices (25a) of each adjacent laminate cell through shafts (26). Each attachment point defines the curved edges (28). The curved edges (28) form bends that provide continuity to the generatrices of each laminate cell (24) in order to transmit the received forces towards each adjacent laminate cell. As a result, the present invention acts as a system; a single laminate cell does not allow for this function to be performed.

An advantage of the present invention is to provide laminate cells with bends located at the end fiber and a body with determined height and proportion. This means that the laminate cells have a cant and two plates that generate a resistant torque that enables the system to optimally resist the main bending stresses.

Another advantage of the present system is the transmission of stresses in all directions and orientations. Due to the shape of the laminate cell, the stresses are transmitted at 360 degrees when the cells are arranged in a determined order and are intertwined with each other. This characteristic allows the transmission of stresses in all directions and orientations within the system. On the other hand, the bending system takes advantage of the stiffness produced by the bends in straight vectors tightened by the double curvature as when creating the first part of the laminate cell called shaft (4) which consists of a preferably equilateral modified hyperboloid and which may be contained in a cube that has been quadrangular or hexagonally cut (in the direction of the rotation thereof, that is, in the circle that was generated), it allows us to create hyperbolic edges that will provide the system with continuous attachments with other shafts required for working as a whole, these attachments are formed as bends. In order to achieve the adequate work for the system to receive the main bending stresses, the second part of the cell has been created. The second part of the cell consists of a crosspoint of bends operating as an end fiber and is attached to the shaft by the hyperbolic bend mentioned previously. The second part of the cell is made by four or six hyperboloid segments. These two parts encompass the entire cell.

Another advantage of the present system is the creation of recesses generated between cells (recesses found in the spaces between the shafts). This enables the system for the passage of different kinds of installations like multi-directional pipelines, it can also work as a fluid container. This characteristic is the original reason that gave rise to this construction system.

Another advantage of the present system is that the laminate cells have two recesses. The first recess is the one mentioned in the preceding paragraph, which derives from the attachment of the laminate cells. The second recess lies within the laminate cell itself and exists between the cap and the shaft. This second recess allows for the isolation of noise and temperature through vacuum. Additionally, this second recess allows the material to be used as a container for materials suited thereto.

Finally, the construction system of the present invention is a system with the advantage of being extremely lightweight since it is made from minimum material from the thin sheets it uses. This feature is one of the most important characteristics of this construction system.

What is claimed is:

1. A construction system forming a covered structured, the construction system comprising:
   at least two laminate cells attached together to absorb and transmit stresses in a plurality of directions and orientation, wherein each of the laminate cells comprises:
      a hollow main body having top edges at a top end, bottom edges at a bottom end, and a substantially hyperboloid shaped thin wall that projects between the top edges and the bottom edges, wherein at least one of the top edges and at least one of the bottom edges connect to respective top and bottom edges of another of the laminate cells to enable the laminate cells to absorb and transmit stresses in the plurality of directions and orientations; and
      a pair of hyperbolic caps including a top cap and a bottom cap, wherein the top cap covers the top end and the bottom cap covers the bottom end, wherein each of the hyperbolic caps define one or more crosshead bends located transversally across a width of one of the corresponding hyperbolic cap, wherein the one or more crosshead bends increase resistance in the plurality of directions and orientation.

2. The construction system according to claim 1, wherein the top end and the bottom end of each of the laminate cells are substantially square shaped.

3. The construction system according to claim 2, wherein both the top edges and the bottom edges of each of the laminate cells includes four edges defined between four tips attached together by substantially curve-shaped awns.

4. The construction system according to claim 3, wherein the one or more crosshead bends generate four hyperboloid sections with the substantially curved awns that coincide with the respective end of the hollow main body to increase the resistance in the plurality of directions and orientations.

5. The construction system according to claim 1, wherein the top end and the bottom end of each of the laminate cells has a substantially hexagonal shape.

6. The construction system according to claim 5, wherein both the top edges and the bottom edges of each of the laminate cells include six edges between six tips and are defined by six substantially curved awns.

7. The construction system according to claim 6, wherein the one or more crosshead bends generate six hyperboloid sections with the substantially curved awns that coincide with the respective end of the hollow main body to increase the resistance in the plurality of directions and orientations.

8. The construction system according to claim 1, wherein the laminate cells are attached together such that forces exerted upon one of the laminate cells are transmitted from the respective hyperbolic caps towards the hyperbolic caps of the adjacent ones of the laminate cells and, at the same time, towards an interior of the hollow main body through the substantially hyperboloid shaped thin wall, distributing the force in all directions on the entire system.

9. The construction system according to claim 1, wherein each of the laminate cells includes hyperbolic arches that are connected with respective hyperbolic arches of an adjacent one of the laminate cells to form a hyperbolic loop for absorbing and transmitting stresses in the plurality of directions and orientation and to act as a stiffening element.

* * * * *